United States Patent [19]

Smith

[11] Patent Number: 4,872,280
[45] Date of Patent: Oct. 10, 1989

[54] AUTOMATIC FISHHOOK SETTING DEVICE

[76] Inventor: Benjamin L. Smith, 9950 Pine Park Ter., Colorado Springs, Colo. 80908

[21] Appl. No.: 250,051

[22] Filed: Sep. 28, 1988

[51] Int. Cl.⁴ ..................... A01K 91/06; A01K 97/00
[52] U.S. Cl. ............................................... 43/15
[58] Field of Search ..................... 43/15, 16

[56] References Cited

U.S. PATENT DOCUMENTS

| | | | |
|---|---|---|---|
| 2,799,111 | 7/1957 | Voboril | 43/15 |
| 2,824,404 | 2/1958 | Booth | 43/15 |
| 2,984,039 | 5/1961 | Willey | 43/15 |
| 3,559,326 | 2/1971 | Henderson | 43/15 |
| 3,867,779 | 2/1975 | McMaster | 43/15 |
| 3,943,650 | 3/1976 | Johansson | 43/15 |
| 4,091,558 | 5/1978 | Dethlefs | 43/15 |
| 4,332,099 | 6/1982 | Morehead | 43/15 |
| 4,547,990 | 10/1985 | Hero | 43/15 |

OTHER PUBLICATIONS

Washington Times Herald cartoon 4-10-1949.

Primary Examiner—Kurt Rowan
Attorney, Agent, or Firm—Henderson & Sturm

[57] ABSTRACT

An automatic fishhook setting device (10) for use with the tip eyelet (105) and the spaced eyelets (103) of a fishing rod (100); wherein the device (10) includes a tether member (13) adapted to releasably engage one of the spaced eyelets (103) and a contoured leaf spring member (20) attached on one end to the tether member (13) and having a shallow leaf spring segment (21) formed on its other end adapted to releasably engage the tip eyelet (105) when the fishing rod (100) is in a flexed disposition.

3 Claims, 1 Drawing Sheet

AUTOMATIC FISHHOOK SETTING DEVICE

TECHNICAL FIELD

The present invention relates to the field of automatic fishhook setting devices.

BACKGROUND OF THE INVENTION

The present invention was the subject matter of Document Disclosure Program Registration No. 189,224 which was filed in the U.S. Patent Office and Trademark Office on Mar. 23, 1988.

As can be seen by reference to the following U.S. Pat. No's.: 2,799,111; 2,984,039; 3,559,326 and 4,547,990 the prior art is replete with myriad and diverse automatic fishhook setting arrangements.

While all of the aforementioned prior art devices are more than adequate for the basic purpose and function for which they have been specifically designed, these patented constructions are equally deficient in a number of salient respects.

To begin with, most of the prior art constructions are unduly complex and costly by virtue of the large number of parts that are employed in the construction of these devices. In addition, most of these prior art devices are very cumbersome with respect to their attachment both to a rod and a rod holder wherein the setting of the release trigger mechanism requires multiple steps and manipulations of the fishing rod per se.

Based on the foregoing situation there has needless to say existed a longstanding need among fishermen for a simple, inexpensive, lightweight release mechanism that can be quickly and easily installed on a fishing rod to act as an automatic hook setting apparatus; wherein, the apparatus will function in a very simple and efficient, virtually fail safe manner to cause the inherent flexibility of the fishing rod to use released stored energy to accomplish the actual hooking of a fish.

SUMMARY OF THE INVENTION

Briefly stated, the automatic fishhook setting device that forms the basis of the present invention comprises a tether unit and a spring release unit. The tether unit is adapted to be releasably secured on one end to a portion of a fishing rod; and, secured on its other end to the spring release unit.

The spring release unit comprises in general: a contoured leaf spring member which is secured on one end to the tether unit; wherein, the free end of the contoured leaf spring member is adapted to releasably engage the flexed tip of a fishing rod when the leaf spring member is in its stressed configuration.

When a fish grabs the baited hook that is attached to the fishing line that passes through the flexed tip of the fishing rod the rod tip will experience additional flexure which will serve to disengage the spring release unit, thereby allowing the rod tip to spring upwardly and drive the fishhook into penetrating engagement with the mouth of the fish.

In addition, since the fishhook setting device of this invention is so lightweight the spring release unit will be suspended form the fishing rod by the tether unit and be out of the way of the user as they proceed to fight the fish in the normal manner.

Furthermore, when the fishhook setting device of this invention is employed in certain environments such as a boat or a dock, the spring release unit will give an audible indication when it strikes a hard surface on the boat or dock.

BRIEF DESCRIPTION OF THE DRAWINGS

These and other objects, advantages and novel features of the invention will become apparent from the detailed description of the best mode for carrying out the preferred embodiment of the invention which follows; particularly when considered in conjunction with the accompanying drawings, wherein.

BEST MODE FOR CARRYING OUT THE INVENTION

Figure 1:
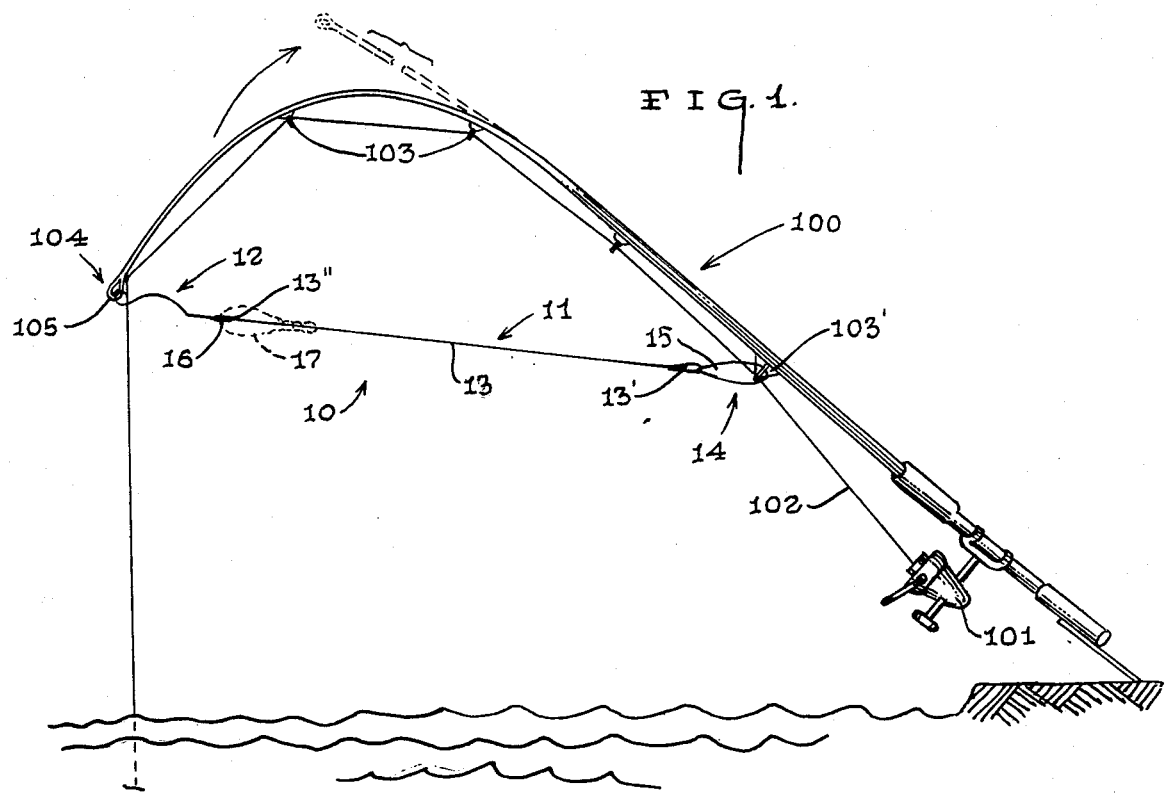
FIG. 1 is a perspective view of the automatic fishhook setting device of this invention deployed on a fishing rod.

As can be seen by reference to the drawings and in particular to FIG. 1, the automatic fishhook setting device that forms the basis of the present invention is designated generally by the reference numeral (10). The device (10) comprises in general: a tether unit (11) and a spring release unit (12). These units will now be described in seriatim fashion.

Prior to embarking on a detailed description of the device (10), it should first be emphasized that the device (10) is designed to be used in conjunction with a conventional fishing rod (100) having a reel (101) equipped with fishing line (102) which is attached on one end to a baited hook (not shown); wherein, the fishing rod is provided with a plurality of spaced line eyelets (103) which terminate at the rod tip (104) in a tip eyelet (105).

As shown in FIG. 1, the tether unit (11) comprises an elongated tether member (13) having releasable attachment means (14) such as a snap swivel (15) disposed on one end (13') for releasably securing the tether member (13) to one of the line eyelets (103') disposed along the length of the fishing rod (100); wherein, the eyelet (103') is spaced a considerable distance form the tip eyelet (105) of the fishing rod. In addition, the other end (13") of the tether member (13) is operatively attached to the spring release unit (12) wherein the operative attachment may be in the form of a knot (16) or another snap swivel (17) shown in phantom.

Figure 2:
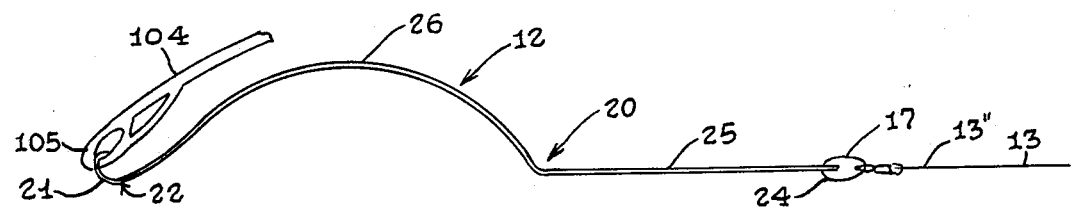
FIG. 2 is an enlarged detail view of the engagement between the spring release unit of the device with the flexed tip of a fishing rod.
Figure 3:
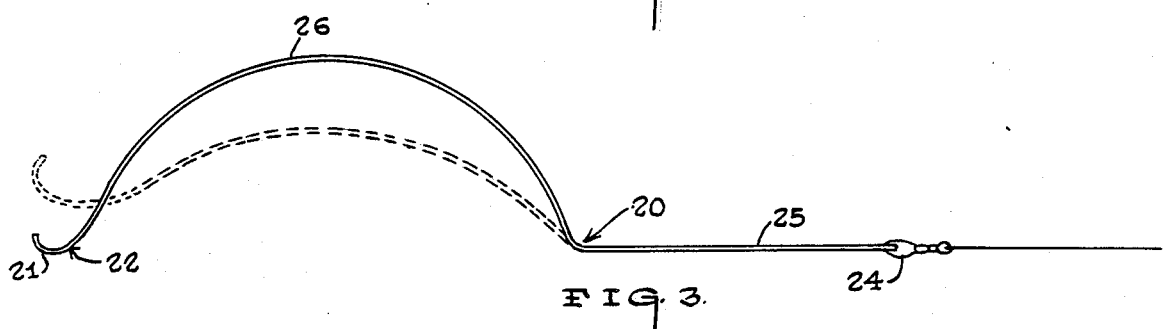
FIG. 3 is a side plan view of the spring release unit in both a stressed and relaxed configuration; and, FIG. 4 is a top plan view of the spring release unit.
Figure 4:
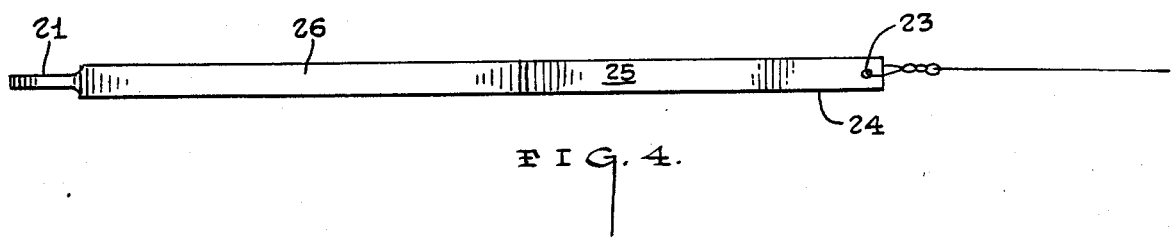

As can best be seen by reference to FIGS. 2 thru 4, the spring release unit (12) comprises in general: an elongated contoured leaf spring element (20) having a shallow leaf spring hook segment (21) formed on one end (22) and a discrete aperture (23) formed on its other end (24); wherein, the shallow hook portion (21) is adapted to engage a portion of the tip eyelet (105) of the fishing rod (100); and, wherein the discrete aperture (23) forms an attaching surface for the operative engagement of the other end (13") of the tether member (13) by either the knot (16) or the snap swivel (17).

As can be seen particularly by reference to FIGS. 2 and 3, the apertured end (24) of the contoured leaf spring member (20) comprises a generally elongated flat leaf spring segment (25); wherein a curved intermediate leaf spring segment (26) is disposed between the flat leaf spring segment (25) and the shallow hook leaf spring segment (21) has an arcuate configuration; wherein the leaf spring hook segment (21) and the intermediate arcuate segment (26) combine to form a generally S-shaped configuration.

Turning now to FIG. 4, it can be appreciated that the leaf spring hook segment (21) has a reduced width relative to the remaining leaf spring segments (25) and (26) wherein the spring coefficient of the leaf spring hook segment (21) will be substantially weaker than the remainder of the contoured leaf spring member (20).

As shown in FIG. 3, in the relaxed state of the contoured leaf spring member (20) depicted in solid lines the free end of the leaf spring member (20) has a pronounced curvature; however, when the leaf spring member (20) is disposed in its stressed state depicted in dashed lines the curvature is substantially diminished.

Returning once more to FIG. 1, it can be appreciated that the automatic hook setting device (10) is operatively engaged with the fishing rod by releasably attaching the tether member (13) on one end (13') to one of the lower eyelets (103) on the fishing rod (100); whereupon, the tip end of the fishing rod (100) is flexed and the leaf spring member (20) is stressed so that the shallow leaf spring hook segment (21) will engage the tip eyelet (105) of the fishing rod (100).

Now when a fish grabs the baited hook (not shown) the tip end of the fishing rod (100) will be deflected downwardly by the tug of the fish on the line (102); whereby, the shallow leaf spring hook segment (21) will become disengaged from the tip eyelet (105) allowing the rod tip to spring upwardly to the position indicated by the dashed lines. This sudden upward movement of the rod tip will be transmitted through the fishing line to hook the fish in a well recognized manner.

Having thereby described the subject matter of this invention it should be apparent that many substitutions, modifications, and variations of the invention are possible in light of the above teachings. It is therefore to be understood that the invention as taught and described herein is only to be limited to the extent of the breadth and scope of the appended claims.

I claim:

1. An automatic fishhook setting device for use in conjunction with a conventional fishing rod having a plurality of spaced eyelets and a rod tip having a tip eyelet wherein the device consists of:
   a tether unit connected on one end to one of the spaced eyelets on the fishing rod; wherein, the tether unit comprises an elongated tether member having releasable attachment means for releasably securing said one end of the tether unit to one of the spaced eyelets on said fishing rod; and,
   a spring release unit comprising a contoured leaf spring member which is releasably connected on one end to the rod tip eyelet and operatively attached on the other end to the tether unit wherein the contoured leaf spring member comprises: a shallow leaf spring hook segment formed on one end of said leaf spring member; a curved intermediate leaf spring segment formed as an extension of said shallow leaf spring segment; and, a generally flat leaf spring segment formed as an extension of the curved leaf spring segment; wherein, the shallow leaf spring segment and the curved intermediate leaf spring segment combine to form a generally S-shaped configuration on the forward portion of the contoured leaf spring member and the generally flat leaf spring segment is operatively connected to the other end of the tether unit whereby the only operative connection between the conventional fishing rod and the automatic fishook setting device occurs between the releasable attachment means on one end of the tether unit with a selected one of said plurality of spaced eyelets on the fishing rod, and the free end of the shallow leaf spring hook segment with the tip eyelet of the conventional fishing rod.

2. The hook setting device as in claim 1; the releasable attachment means comprises a snap swivel.

3. The hook setting device as in claim 1 wherein the width of the shallow leaf spring hook segment is substantially less than the width of the curved leaf spring segment.

* * * * *